(12) United States Patent
Balakrishnan et al.

(10) Patent No.: US 8,880,942 B2
(45) Date of Patent: Nov. 4, 2014

(54) ELECTRONIC DEVICE AND METHOD OF ENSURING GUARANTEED SERVICES

(75) Inventors: Bipin Balakrishnan, Eindhoven (NL); Andrei Radulescu, Eindhoven (NL)

(73) Assignee: ST-Ericsson SA, Geneva (CH)

( * ) Notice: Subject to any disclaimer, the term of this patent is extended or adjusted under 35 U.S.C. 154(b) by 714 days.

(21) Appl. No.: 12/451,986

(22) PCT Filed: Jun. 11, 2008

(86) PCT No.: PCT/IB2008/052307
§ 371 (c)(1),
(2), (4) Date: Apr. 19, 2010

(87) PCT Pub. No.: WO2008/152592
PCT Pub. Date: Dec. 18, 2008

(65) Prior Publication Data
US 2010/0197248 A1  Aug. 5, 2010

(30) Foreign Application Priority Data

Jun. 13, 2007 (EP) .................................... 07110187

(51) Int. Cl.
*G06F 11/00* (2006.01)
*H04L 29/00* (2006.01)
*H04L 1/00* (2006.01)
*H04L 12/801* (2013.01)
*H04L 1/18* (2006.01)
*H04L 12/853* (2013.01)
*H04L 12/851* (2013.01)
*H04L 12/841* (2013.01)

(52) U.S. Cl.
CPC .............. *H04L 47/10* (2013.01); *H04L 1/1877* (2013.01); *H04L 1/188* (2013.01); *H04L 47/2416* (2013.01); *H04L 47/245* (2013.01); *H04L 47/28* (2013.01); *H04L 2001/0098* (2013.01)
USPC .............................. 714/18; 709/235; 709/240

(58) Field of Classification Search
USPC ............ 718/18; 709/240, 225, 226, 229, 232, 709/233, 234, 235; 710/40, 42, 60
See application file for complete search history.

(56) References Cited

U.S. PATENT DOCUMENTS

| | | | |
|---|---|---|---|
| 6,731,605 B1 * | 5/2004 | Deshpande | 370/252 |
| 6,885,638 B2 * | 4/2005 | Xu et al. | 370/230 |
| 6,891,822 B1 * | 5/2005 | Gubbi et al. | 370/345 |
| 7,333,439 B2 | 2/2008 | Itoh et al. | |
| 7,373,579 B1 * | 5/2008 | Jones et al. | 714/748 |
| 7,480,247 B2 * | 1/2009 | Shimojo et al. | 370/236 |
| 8,416,770 B2 * | 4/2013 | Fourcand | 370/352 |
| 2002/0034182 A1 | 3/2002 | Mallory | |
| 2004/0037224 A1 * | 2/2004 | Choi et al. | 370/235 |
| 2004/0248583 A1 * | 12/2004 | Satt et al. | 455/452.2 |
| 2005/0071494 A1 * | 3/2005 | Rundquist et al. | 709/232 |
| 2006/0227736 A1 * | 10/2006 | Conyers et al. | 370/328 |
| 2010/0128725 A1 * | 5/2010 | daCosta et al. | 370/389 |

FOREIGN PATENT DOCUMENTS

| | | | |
|---|---|---|---|
| JP | 2005094305 A | 4/2005 | |
| WO | 0217574 A1 | 2/2002 | |

OTHER PUBLICATIONS

Desoli, et al., "An Outlook on the Evolution of Mobile Terminals: From Monolithic to Modular Multi-radio, Multi-Application Platforms", IEEE Circuits and Systems Magazine, IEEE Service Center, New York, NY, vol. 6, No. 2, Jan. 1, 2006, p. 17-29.

Yang Ji, et al., "A Novel Scheduling Algorithm for IP Traffic in Adaptive Modulation System", VTC Spring 2002, IEEE 55th Vehicular Technology Conference Proceedings, Birmingham, AL, May 6-9, 2002, vol. 6, p. 1809-1813.

Tsou et al. "WDFQ: An Efficient Traffic Scheduler with Fair Bandwidth-Sharing for Wireless Multimedia Services." IEICE Trans. Commun., Apr. 2001, pp. 823-835, vol. E84-B, No. 4.

* cited by examiner

*Primary Examiner* — Joseph Schell
(74) *Attorney, Agent, or Firm* — Coats and Bennett, PLLC

(57) ABSTRACT

A method for ensuring guaranteed services for real-time traffic on an interconnect with errors is provided. The real-time traffic comprises a first and second traffic class (HRT, SRT). Real-time traffic of the first and/or second traffic class (HRT, SRT) is transmitted from a transmitter to a receiver. It is detected by the receiver whether an error has occurred during the transmission of the real-time traffic and the error is reported to the transmitter. At least part of the real-time traffic of the second traffic class (SRT) is re-transmitted by the transmitter if the transmitter has received an error report from the receiver within a predetermined time period.

11 Claims, 11 Drawing Sheets

ELECTRONIC DEVICE AND METHOD OF ENSURING GUARANTEED SERVICES

CROSS-REFERENCE TO RELATED APPLICATION(S)

The present application claims priority under 35 U.S.C. §365 to International Patent Application No. PCT/IB2008/052307 filed Jun. 11, 2008, entitled "ELECTRONIC DEVICE AND METHOD OF ENSURING GUARANTEED SERVICES". International Patent Application No. PCT/IB2008/052307 claims priority under 35 U.S.C. §365 and/or 35 U.S.C. §119(a) to European Patent Application No. 07110187.7 filed Jun. 13, 2007 and which are incorporated herein by reference into the present disclosure as if fully set forth herein.

FIELD OF THE INVENTION

The present invention relates to an electronic device and a method of ensuring guaranteed services.

BACKGROUND OF THE INVENTION

Current mobile systems such as mobile phones or Personal Digital Assistant (PDA) show a continuous increase in complexity due to the ever increasing need for implementing new features and improving existing functions.

In order to reduce cost and to simplify the mechanical design of the smart phones and other application rich networked mobile devices, MIPI has defined a high-speed serial PHY layer (DPHY). MIPI has also specified a layered protocol stack based on OSI protocol stack, namely the Unified Protocol (UniPro), above the PHY layer that provides reliable, networkable; latency aware data transfer between the components or modules in a mobile device. Using error detection and frame re-transmissions, UniPro provides reliability against the errors introduced by noisy mobile environment. Real-time applications like RF to base band communication, video streaming etc that are envisioned to be clients of UniPro need bandwidth guarantees and strict latency/jitter bounds. Re-transmissions will hinder these guarantees.

Real-time traffic is traffic that loses its validity if it is not delivered before the deadline with logical correctness. The real-time traffic is classified as hard real-time or soft real-time. Traffic is hard real-time if it has hard bounds on jitter, while soft real-time could tolerate moderate amount of jitter. However, both of them need guarantees for bandwidth. RF to base band data transmission is an example of hard real-time traffic while compressed video transmission belongs to soft real-time traffic category. A connection oriented data transfer mechanism is employed so that independent guarantees can be provided to each of the connections. An external mechanism determines the bandwidth, jitter and latency requirements of the connections that are set up.

SUMMARY OF THE INVENTION

It is therefore an object of the invention to provide an electronic device and a method for ensuring guaranteed services which can discriminate between hard real-time traffic and soft real-time traffic and which is able to provide guarantees with respect to a communication bandwidth.

This object is solved by a method, and by an electronic device according to embodiments of the present invention disclosed and claimed herein.

Therefore, a method for ensuring guaranteed services for real-time traffic on an interconnect with errors is provided. The real-time traffic comprises a first and second traffic class. Real-time traffic of the first and/or second traffic class is transmitted from a transmitter to a receiver. It is detected by the receiver whether an error has occurred during the transmission of the real-time traffic and the error is reported to the transmitter. At least part of the real-time traffic of the second traffic class is re-transmitted by the transmitter if the transmitter has received an error report from the receiver within a predetermined time period.

According to an aspect of the invention, the communication over the interconnect is based on connections each with at least a guaranteed communication bandwidth, wherein the interconnect is implemented as a serial interconnect.

According to still a further aspect of the invention, the communication over the interconnect is based on connections each with at least a guaranteed communication bandwidth and having a variable bit rate. A first bandwidth is associated to each first connection. A common pool bandwidth unit is provided for associating additional second bandwidth to the first bandwidth if required, for providing third bandwidth before re-transmissions of at least part of the first connections if the first connection comprises traffic of the second traffic class and for providing bandwidth with third connections.

According to still a further aspect of the invention, the traffic comprises hard real-time traffic as first traffic class, soft real-time traffic as second class and control traffic. The control traffic, the first traffic class, re-transmissions of the second traffic class and the second traffic class have priorities associated in decreasing order.

The invention also relates to an electronic device. The electronic device comprises an interconnect for real-time traffic communication. The real-time traffic comprises a first and second traffic class. The electronic device furthermore comprises a re-transmission processing unit for initiating a re-transmission of at least part of the real-time traffic of the second traffic class if a receiver of the traffic has reported an error during the transmission. The electronic device furthermore comprises a real-time traffic arbiter for performing arbitration on the re-transmission of at least part of the real-time traffic of the second class in addition to arbitration on first and second traffic class.

The invention also relates to a method of ensuring guaranteed services for real-time traffic on an interconnect with errors. The communication over the interconnect is based on connections each with at least a guaranteed communication bandwidth. A first bandwidth is associated to each first connection. A common pool bandwidth unit is provided for associating additional second bandwidth to the first bandwidth if required, for providing a third bandwidth for re-transmissions of at least part of the first connection and/or for providing bandwidth for third connections.

According to an aspect of the invention, the communication over the interconnect comprises a variable bit rate, wherein the real-time traffic comprises a first and a second traffic class. The common pool bandwidth unit is adapted for providing third bandwidth for re-transmissions of at least part of the first connections if the first connections comprise traffic of the second traffic class.

The invention also relates to an electronic device which comprises an interconnect for real-time traffic communication based on connections. The real-time traffic comprises a first and second traffic class. The electronic device furthermore comprises a connection processing module unit for processing the connections, a re-transmission processing unit for initiating a re-transmission of at least part of the real-time traffic of the second traffic class if a receiver of the traffic class has reported an error during the transmission. The electronic device furthermore comprises a real-time traffic arbiter for performing an arbitration of the re-transmission of at least part of the real-time traffic of the second class in addition to performing arbitration on first and second traffic class. According to an aspect of the invention, the real-time traffic arbiter comprises a common pool bandwidth unit for associating additional second bandwidth to the first bandwidth if required, for providing third bandwidth for re-transmissions of at least part of the first connections if the first connection comprises traffic of a second traffic class and for providing bandwidth for third connections.

The present invention relates to the idea to discriminate between hard and soft real-time traffic and to provide the bandwidth guarantees and hard bounds for jitter and latency to both categories of real-time traffic. Hard low bounds can be provided on jitter for hard real-time traffic and the reliability of soft real-time traffic can be improved by allowing a fixed number of re-transmissions.

However, re-transmission for hard real-time is futile as it introduces significant jitter. Even if errors are detected, hard real-time traffic is delivered to the application with these errors. This is because hard real-time applications are able to handle errors in data, but do not accept delays in the data transmission. For soft real-time traffic, the robustness of data transfer can be improved through a fixed number of re-transmissions, e.g. one-time re-transmission based on frame sequence numbers. By modifying the existing NAC control frames in UniPro from the remote node to carry the frame sequence number of the last correctly received soft real-time traffic; a re-transmission scheme can be implemented. It should be noted that Negative acknowledgement frames NAC can be send from local node or from a remote node. The remote node NAC's are used to determine which frames need to be re-transmitted. While the local node sends NAC to intimate the remote node that some frames send by it to local node was received in error.

In the case of Variable Bit Rate real-time traffic (VBR-rt, e.g., compressed video transmission), bandwidth for the minimum data rate for the connection is allocated instead of allocating bandwidth for the maximum rate. In order to absorb the variations, the remaining quota of bandwidth is allocated in a "common pool". This common pool of bandwidth is shared by control traffic (highest priority, e.g. (Transmit side) NAC), replay traffic, VBR-rt (lowest priority) or other traffic such as Tc-0, Tc-1. The size of the common pool is dependent on the traffic characteristics at a node.

A real-time arbitration works at the granularity of variable sized UniPro frames, which can be pre-empted. Hence, there is no concept of fixed size slots. Each connection makes a request to the arbiter as soon as it has a frame to transmit. Also there could be requests as a result of re-transmission scheme. All the requests fall into one of the following traffic categories, namely hard real-time (highest priority) or re-transmission or soft real-time (lowest priority). When there is a contention, the highest priority category is selected. Ties within a category can be resolved using a priority mechanism inside the category, wherein. only hard real-time traffic RT and soft real-time traffic RT can experience such a tie. The re-transmission category can be seen as one connection and thus by construction does not need a tie breaking mechanism. The assignment of priorities within a category is done at the connection setup based on the bandwidth, the jitter requirements of the traffic flow. Once the real-time arbiter makes a decision, it issues a grant. Grants issued to lower priority category can be pre-empted by requests from higher priority category.

Once the pre-emption is over the arbiter returns to the pre-empted connection. Pre-emption is not allowed within a traffic category. The arbiter schedules the grant for the next frame, when the currently granted frame gives an end of frame indication. Though it looks like added latency in scheduling, it can be absorbed by pipeling and also by the L2 (level 2) trailer transmission.

Efficient link bandwidth allocation can be performed through the concept of "common pool" bandwidth, which is shared by control, re-transmission and VB-Rt.

Furthermore, the present invention relates to the idea to support "group" data transmission, which reduces the power consumption. Moreover, no acknowledgements or flow control is required, which, in the case of a unidirectional data flow allows the return link to be put in a low power mode, reducing the link power consumption by a factor of 2.

The guarantees can be provided individually on a per connection basis, allowing a mixture of real-time and best effort applications to co-exist and be optimized individually. The principles of the invention can be compatible with UniPro.

Further aspects of the invention are defined in the dependent claims.

BRIEF DESCRIPTION OF THE DRAWINGS

Embodiments and advantages of the invention will now be described in more detail with reference to the figures.

DETAILED DESCRIPTION OF EMBODIMENTS

Figure 1:
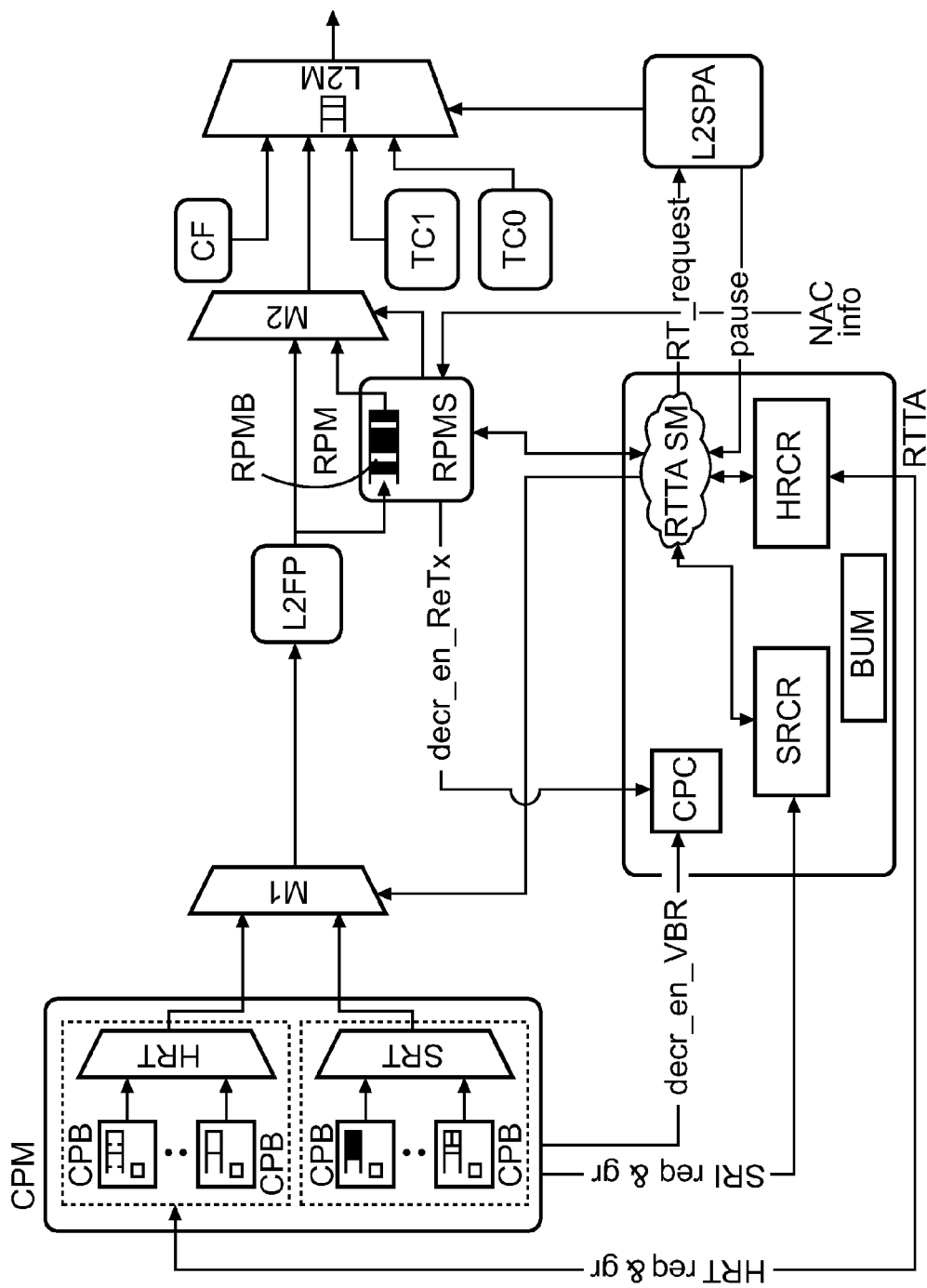
FIG. 1 shows a basic block diagram of an electronic device according to a first embodiment.

FIG. 1 shows a block diagram of an electronic device according to the invention. The electronic device comprises a connection processing module unit CPM, a multiplexer M1 coupled to the output of the connection processing module unit CPM, a L2 frame processing unit L2 FP, a re-transmission processing unit RPM, a second multiplexer M2, a real-time traffic arbiter RTTA, a L2 static priority arbiter L2 SPA and a L2 multiplexer L2M. The connection processing module unit performs the request generation and grant processing for individual connections. The connection processing module unit CPM is built up of (identical) sub-modules, namely connection processing block units CPB that belong to either hard or soft real-time traffic category. Re-transmission traffic is considered as a separate connection and is serviced by the Re-Transmission Processing unit RPM. The re-transmission processing unit RPM is similar to a connection processing module unit CPM sub-module. The real-time traffic arbiter RTTA arbitrates between the requests from various connections and provides the grant to the highest priority connection. The real-time traffic arbiter RTTA interacts with the connection processing module unit CPM and the re-transmission processing unit RPM through handshake signals to make the decisions. The L2 frame processing module L2FPM adds the frame header and trailer information needed for the packet to be carried on a UniPro network as a data frame and L2 static priority arbiter L2SPA performs arbitration between control, real-time and other traffic class frames.

The hard real-time request contention resolution and grant distribution unit HRCR generates a collective request for all hard real-time traffic HRT connections and the arbiter RTTA shows a collective grant back to this unit which can be distributed. The soft real-time request contention resolution and grant distribution unit SRCR generates a collective request for all soft real-time traffic SRT connections and the arbiter RTTA issues a collective grant back to this unit which is then distributed. The state machine RPMS of the re-transmission processing unit RTM issues re-transmission requests to the state machine RTTASM of the arbiter RTTA and the state machine issues grants back to the state machine of the re-transmission processing unit RPMSM.

The connection processing module unit CPM consists of identical blocks called connection processing units CPB, one for each connection.

Figure 2:
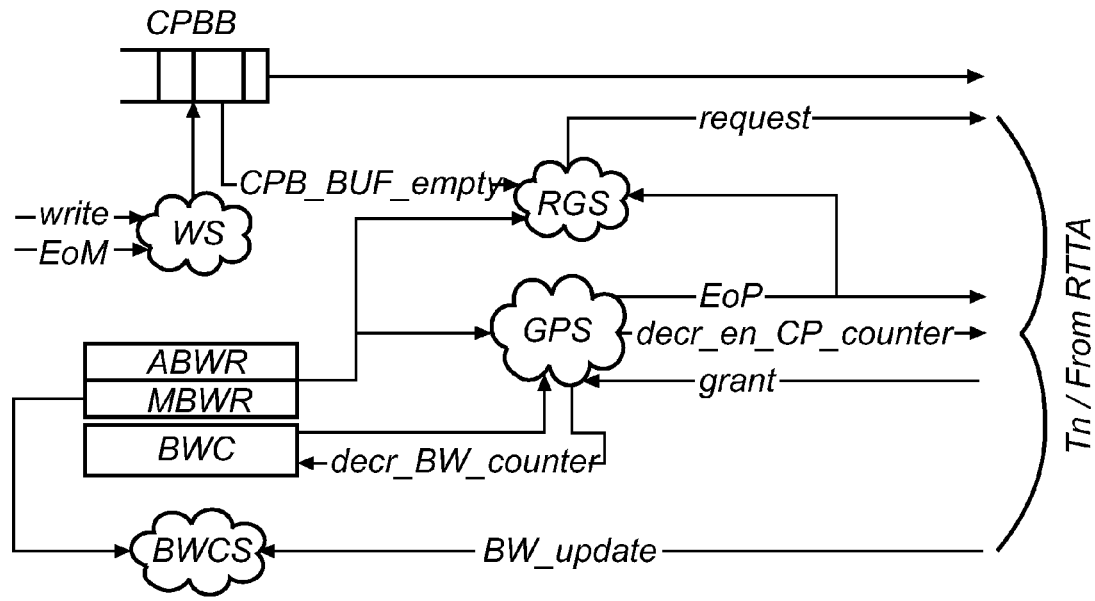
FIG. 2 shows a basic block diagram of a connection processing block unit according to a first embodiment.

FIG. 2 shows a block diagram of a connection processing block unit of FIG. 1. The connection processing block unit CPB comprises a bandwidth counter BWC, a connection buffer CPBB, and a connection processing CPB state unit. The CPB state unit is further split into write unit WS, request generation state machine RGS and grant processing state machine GPS. Registers MBWR, ABWR serve to hold the minimum and additional bandwidth allocated to a particular connection, and end address of packets in the buffer is stored in a small memory (contained inside the write unit). This is required as variable length packets are supported within a connection. The minimum bandwidth register MBWR stores the bandwidth that is guaranteed to a connection. The additional bandwidth register ABWR stores the additional bandwidth that can be used from the common bandwidth pool. For all non variable bit rate VBR-rt traffic, the value in the additional bandwidth register can be zero. The connection processing block unit CPB uses the values in these registers in making decisions.

The bandwidth counter BWC is loaded periodically (for example, once every 100 microseconds) with the value from minimum bandwidth register.

Figure 3:
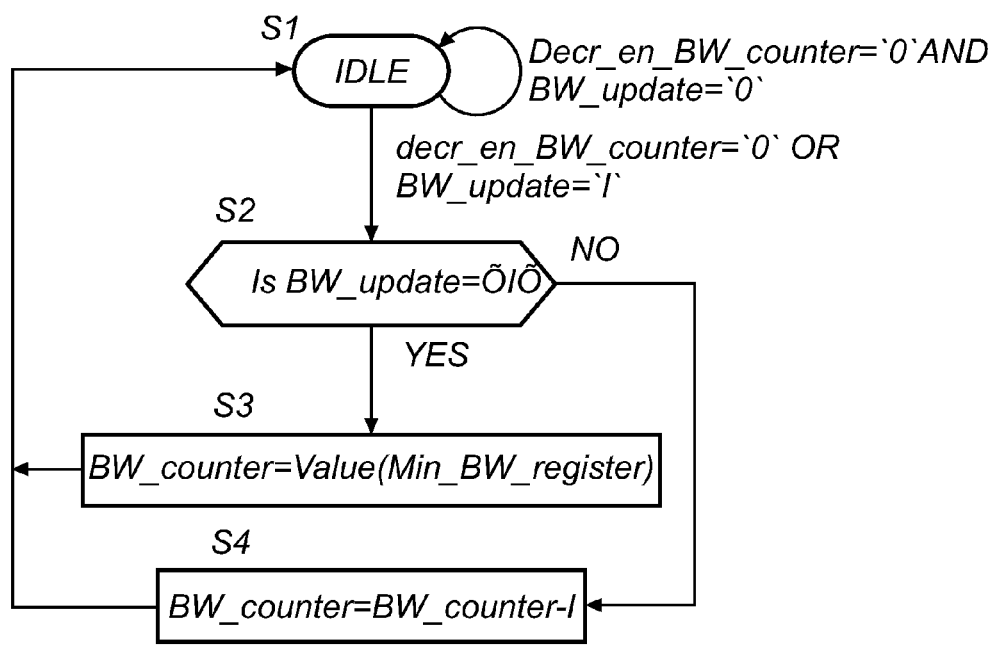
FIG. 3 shows a flow chart of a bandwidth counting state machine according to the invention.

FIG. 3 shows a flow chart of a bandwidth counter state machine. The bandwidth counter method or state machine as performed in the bandwidth counter BWC is triggered in the idle state (step S1) when either a decrement enable dec_en_BW or bandwidth update BM_update is received. First if there is a (periodical) BW update true (step S2), then the BW counter is loaded with the value from the minimum bandwidth register MBWR (step S3). The state machine returns to the IDLE state (step S1) because even if there was a simultaneous decrement enable, it was already accounted for in the bandwidth of the former interval. If the BW update check is false (step S2) then it proceeds to decrement the counter BWC (step S4). If additional bandwidth is provided, the value of the counter BWC can become negative down to the value of the additional bandwidth register ABWC. The check for bandwidth availability is done by grant processing state machine.

The connection buffers CPBB in the connection processing unit could be either logical or physically separate ones for each of the connections. The primary function of these buffers are to hold data when there is a contention between traffic flows of a same traffic category or when a "pause" is generated due to L1/L2 re-initialization or higher priority frame transmission.

It is assumed that the write and read to the buffers are handled at the granularity of bytes. Alternatively, the buffer can be also implemented with word granularity and then all the buffer control should be changed correspondingly.

The connection state machine generates requests to the real-time traffic arbiter RTTA, if there is bandwidth available and data to transmit (request state machine). It processes grants from the real-time traffic arbiter RTTA (grant processing state machine). It enables data transmission from the connection buffer based on the grant from the real-time traffic arbiter RTTA (grant processing state machine). It enables writes to the connection buffer when there is space in the buffer (write state machine). It generates decrement enables to the BW counter BWC (or common pool counter for additional BW) whenever there is a transmit enable (grant processing state machine).

The connection processing block unit CPB state machine is split into three sub state machines, namely request generation RGS, grant processing GPS and write state machines WS. Request generation state machine RGS generates requests to the real-time traffic arbiter RTTA while the grant processing state machine GPS processes the grant from the real-time traffic arbiter RTTA. The request generation state machine RGS tracks the number of packets written into the buffer through a write packet pointer (Wr_pkt) and the grant processing state machine GPS tracks the packets read out through the read packet pointer (Rd_pkt). These pointers store packet numbers. Separate write address pointer (Wr_addr) and read address pointer (Rd_addr) are used to point to byte addresses in the CPB buffer. Write state machine controls the writes into the CPB buffer from the application using UniPro.

Figure 4:
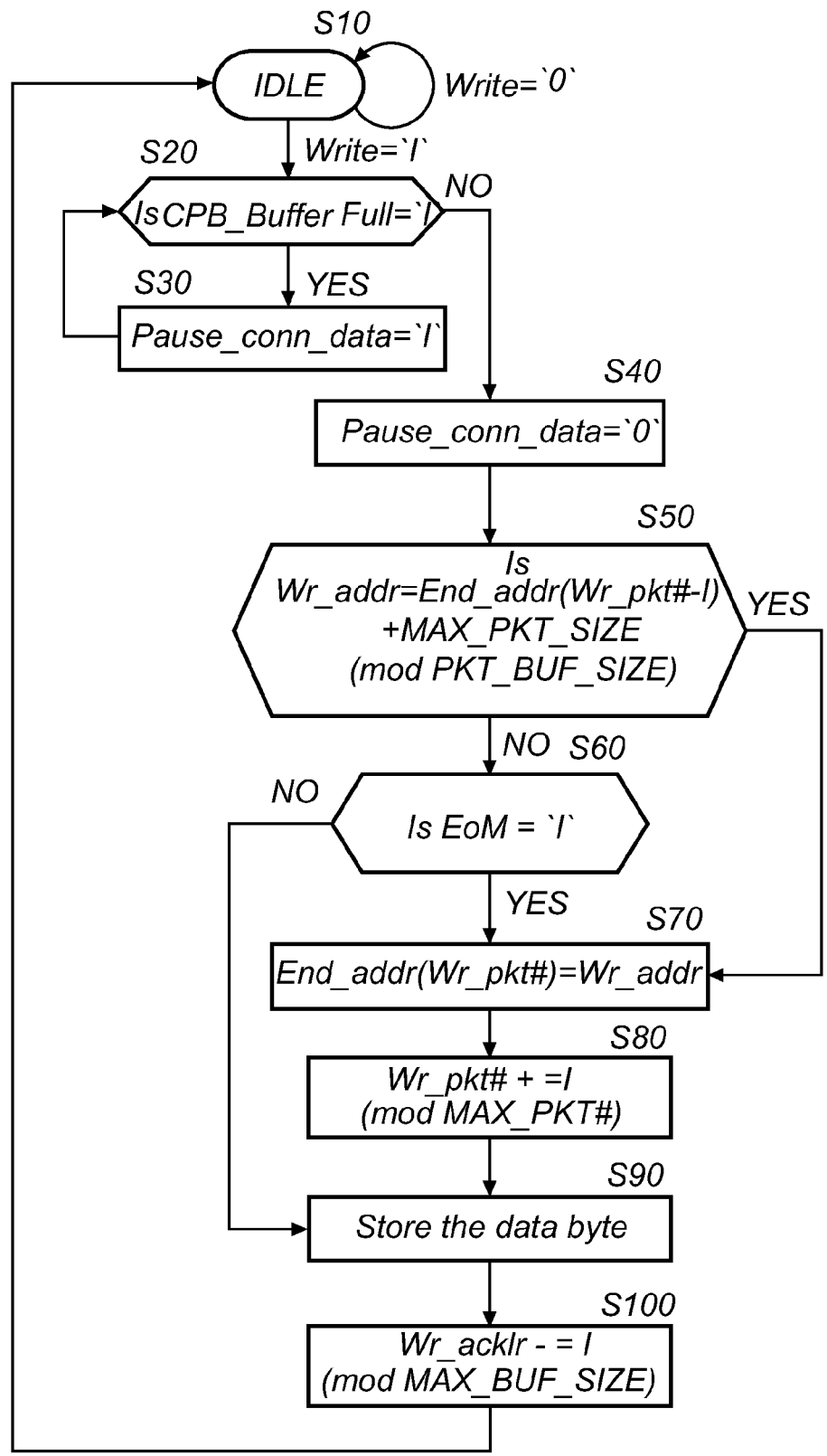
FIG. 4 shows a flow chart of a state machine for writing into a buffer according to the invention.

FIG. 4 shows a flow chart of a buffer write state machine according to the invention. Here, a state machine which controls writes to the buffer CPBB in the connection processing unit is shown. The state machine comes out of the IDLE state (step S10) whenever a write is requested to the buffer. First a check is made to see whether the buffer (CPB_buffer_full) is full (step S20) and if it is true then the connection is asked to pause the writes into the buffer (step S30). The state machine waits until a grant is received, for a previous request from this connection, resulting in the data being read out from the buffer. If there is space in buffer CPBB to store the data, a check is made (step S50) to know whether number of bytes written in the current packet is equal to maximum packet size. If this is the case then a complete packet is available for transmission. While comparing the write byte address Wr_addr to the connection buffer CPBB, it is accounted for the address wrap around by doing a modulus operation. It is also possible that End of Message (EoM) occurs (step S60), which can mean that the last chunk of the message is less than the maximum size of the packet allowed in UniPro. Also if a message in UniPro is less than the maximum packet size then an EoM will be generated. This condition is checked if the first one is not true. If either of these two conditions is true the write address is stored in the packet size memory as end of packet address. The write packet pointer (Wr_pkt) is incremented to point to next packet while write address pointer (Wr_addr) of the buffer is incremented to point to the next location (step S100). The state machine returns to the IDLE state to wait for a new write.

The above implementation uses a store and forward technique for sending packets, in which a packet is first completely stored, and only afterwards transmitted. Alternatively, in a so-called cut through implementation, a sending of a packet is started as soon as the first words in the packet are received. Cut through has advantage that the packet transmission latency is reduced.

Figure 5:
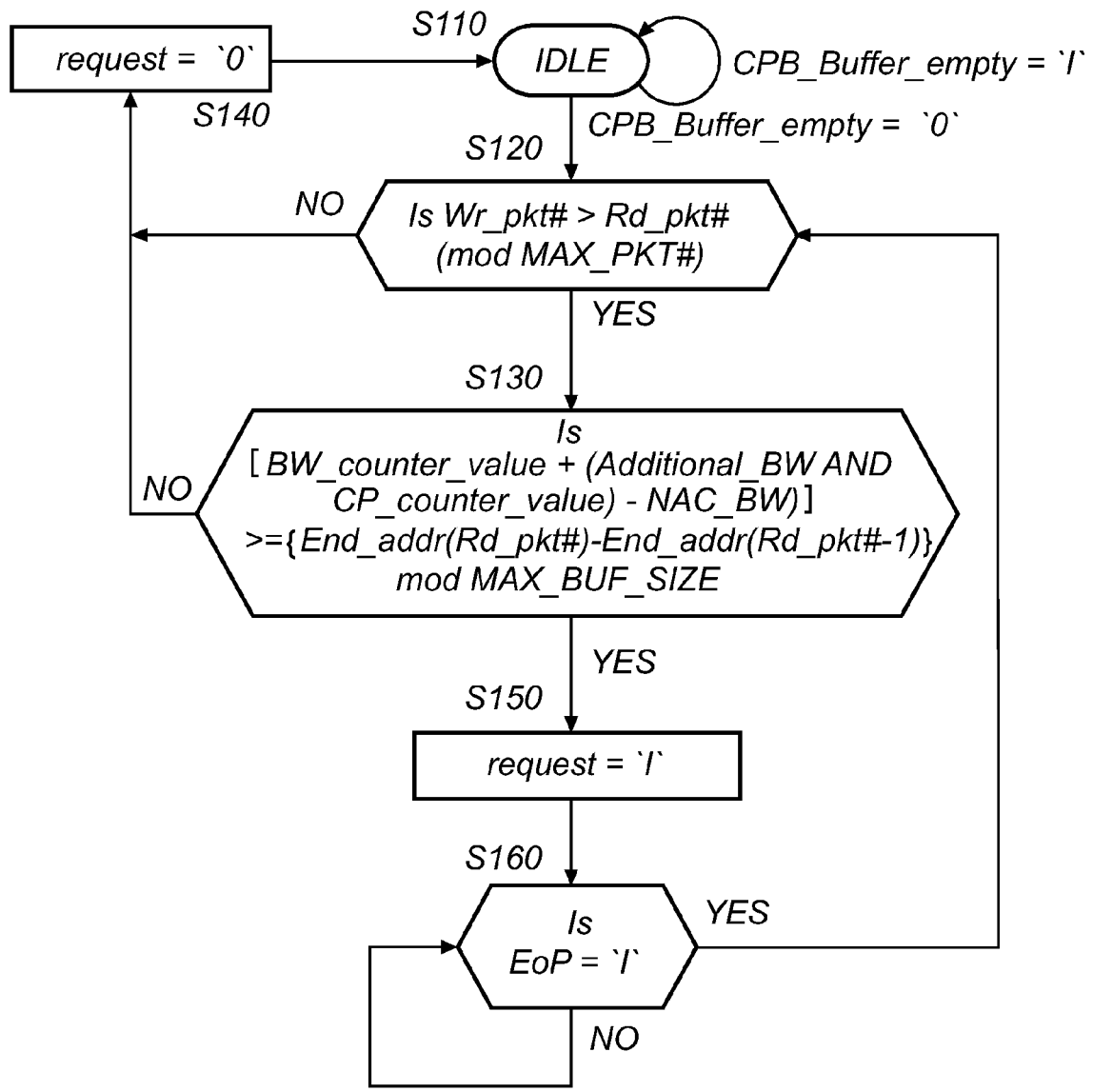
FIG. 5 shows a flow chart of a state machine of request generation according to the invention.

FIG. 5 shows a flow chart of a request generation state machine according to the invention in a connection processing unit according to FIG. 1. The request generation state machine is triggered whenever there is data in the connection buffer as determined by the variable CPB_buffer_empty (step S110). First a check is made (step S120) to see if any packets are present that are to be transmitted by comparing the write and read packet pointers Wr_pkt#; Rd_pkt#. If there is a case for request generation, a check is made (step S130) to see if the connection has enough bandwidth to transmit the complete frame. The bandwidth for headers and trailers of L2 is omitted for simplicity, but is accounted for in the bandwidth counter BWC. The bandwidth counter value BW_counter_value is added to the bandwidth available from common pool Additional_BW to calculate the bandwidth available to the connection. Here, it is accounted for the bandwidth of a possible NAC control frame, which can pre-empt this connection and shares bandwidth from the common pool. If there is enough bandwidth available then a request signal to the real-time traffic arbiter RTTA is asserted (step S150). Else the state machine goes back to the IDLE state. Once the request signal is asserted, the state machine waits until it gets an End of Packet signal (S160) from the grant processing state machine. Again a check is made to determine if any more requests need to be made. If there is the steps are repeated. Else state machine returns to IDLE state (S110) after de-asserting the request signal (S140).

Figure 6:
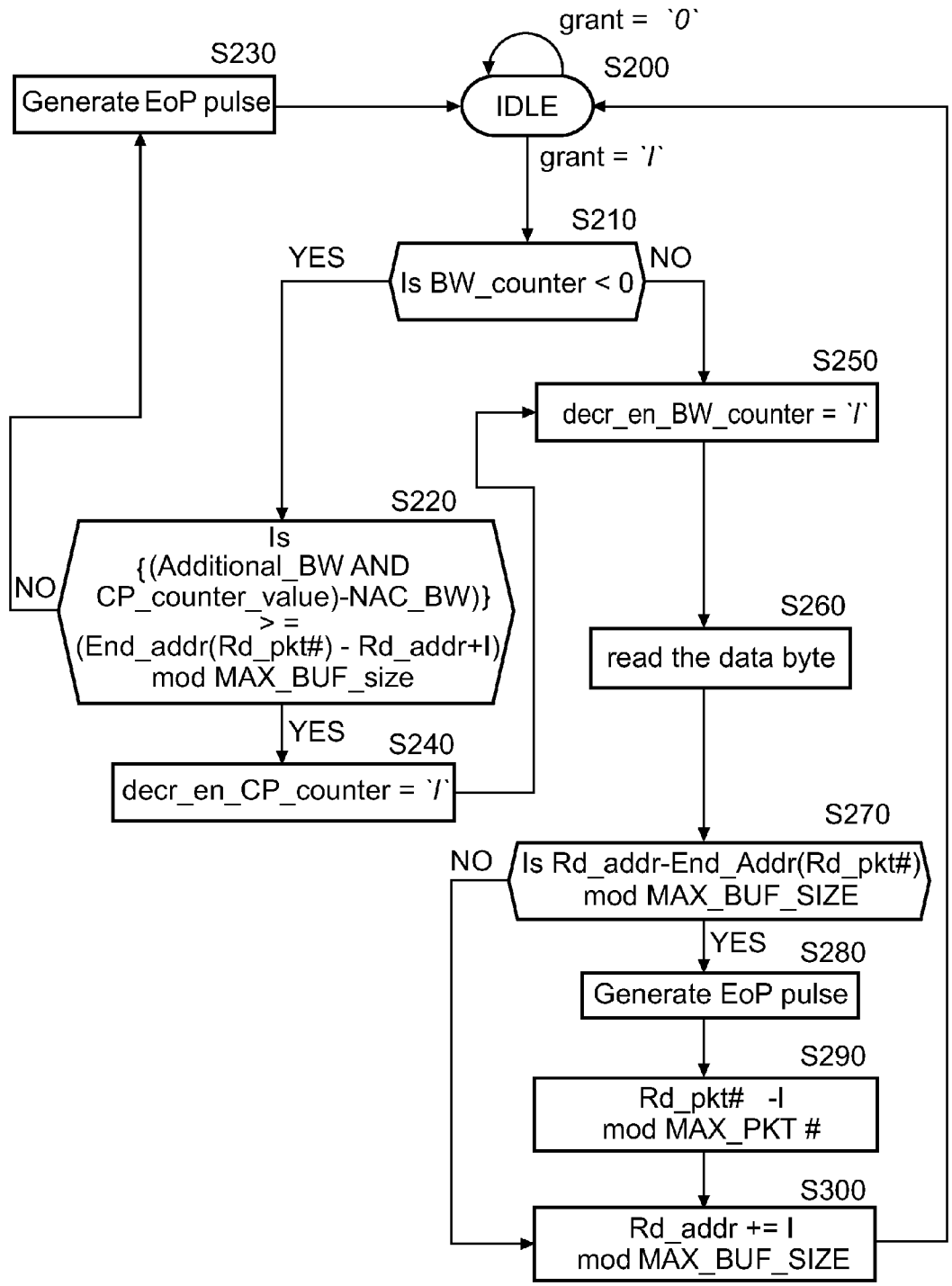
FIG. 6 shows a flow chart of a grant processing state machine according to the invention.

FIG. 6 shows a flow chart of a grant processing state machine in a connection processing unit of FIG. 1. After a request from a connection processing block unit CPB, the real-time traffic arbiter RTTA eventually issues a grant in response. This grant triggers the CPB grant processing state machine. Since some connections can borrow additional bandwidth from the common bandwidth pool, it is checked (step S210) if the connection is going to use its own bandwidth or bandwidth from common pool. This can be performed by checking if the bandwidth counter is negative, which implies that it needs to consume bandwidth from common pool. While making a request it has already been checked for whether there is bandwidth available to transmit the packet. If the bandwidth counter BW_counter is not negative then decrement enable pulse to the bandwidth counter is given (step S250) while the byte is being read out (S260). Then a check is made (step S270) to see if this byte was the last byte of the packet pointed to by the read packet pointer. If it is, then an end of packet (EoP) pulse is generated (step S280) to the real-time traffic arbiter RTTA. Read packet pointer is incremented by one (S290) and also the read address pointer to the CPB buffer is incremented (S300). If the end of packet is not reached then only the read address pointer to the CPB buffer is incremented (step S300).

If the bandwidth counter is negative then few additional steps are necessary. First (step S220) a check is done again to see if there is enough bandwidth available for the complete packet similar to the one carried out in the request generation state machine. This is required because a possibility exists that this connection bid for the bandwidth remaining in common pool simultaneously with another (higher priority) connection while making the request. The higher priority connection would have won the arbitration and would have used up the bandwidth leaving not enough bandwidth to transmit. The real-time traffic arbiter RTTA does not look at the bandwidth while doing the arbitration. Instead, this is performed by the connection processing module unit CPM. Hence, the case in which common pool bandwidth is consumed and a bandwidth check is made again before proceeding with the packet transmission (step S220). If there is bandwidth available, then the decrement enable to the common pool counter is pulsed (S240) and the state machine proceeds to carry out the steps in the non-negative bandwidth counter case. If there is no enough bandwidth left an EoP is signaled without incrementing the read packet and read address pointers and state machine returns to IDLE state. This EoP helps to trigger the RTTA to arbitrate requests from other connections.

The re-transmission processing unit RPM serves to control the re-transmission of the soft real-time traffic. It comprises a re-transmission state machine RPMS and re-transmission buffer RPMB. Like the connection processing block unit CPB, a memory is present that stores the frame boundaries, which is used to generate the end of frame indications. Unlike the CPB, there is no dedicated bandwidth counter and also any registers. The functionality of this block is similar to the connection processing block unit CPB.

The re-transmission buffer RPMB receives data after the L2 frame-processing unit L2FP adds the necessary L2 headers and trailers to the SRT packets. Re-transmission buffer stores all the soft real-time frames in the same order as they were transmitted the first time. It has a write frame pointer and a re-transmission frame pointer. Every frame belonging to the soft real-time category that is transmitted has a frame sequence number similar to the ones carried in Traffic Class-1 and Traffic Class-0 in UniPro. The pointers always point to frame sequence numbers. A small memory is provided that stores the frame sequence number and the end byte address of the frame. This allows writing in variable length frames. If a part of a frame is overwritten, the pointers jump to the next frame sequence number. Write frame pointer is incremented by a frame sequence number each time a new frame is written into the replay buffer, which occurs in parallel as the frame is transmitted the first time. Whenever the write frame pointer rolls over and catches up with re-transmission frame pointer, the pointer is required to track the write pointer else it may not be pointing to the oldest frame in the buffer that is unacknowledged. Thus re-transmission frame pointer gets updated when either the write frame pointer catches up with it (a situation easily happening when there is no NAC for a while) or when a NAC is received. The re-transmission state machine, described later, gives more clarity on the functioning of the re-transmission buffer and re-transmission-processing block.

The re-transmission state machine RPMS generates requests to the real-time traffic arbiter RTTA, whenever a NAC frame is received and there is a case for re-transmission. The re-transmission state machine processes grants from the real-time traffic arbiter RTTA and it enable data read from the re-transmission buffer when a grant is available. The re-transmission state machine stores the data frames when soft real-time traffic is being transmitted the first time, generates a decrement indication to the common pool counter, when data is being transmitted and adjusts the re-transmission pointer of the buffer whenever the data gets over written.

This state machine is also split into three sub-state machines. One state machine generates requests to the RTTA while the other one processes the grant from the RTTA. The re-transmission frame pointer is updated done by a third state machine whenever an overwrite occur in the buffer.

Figure 7:
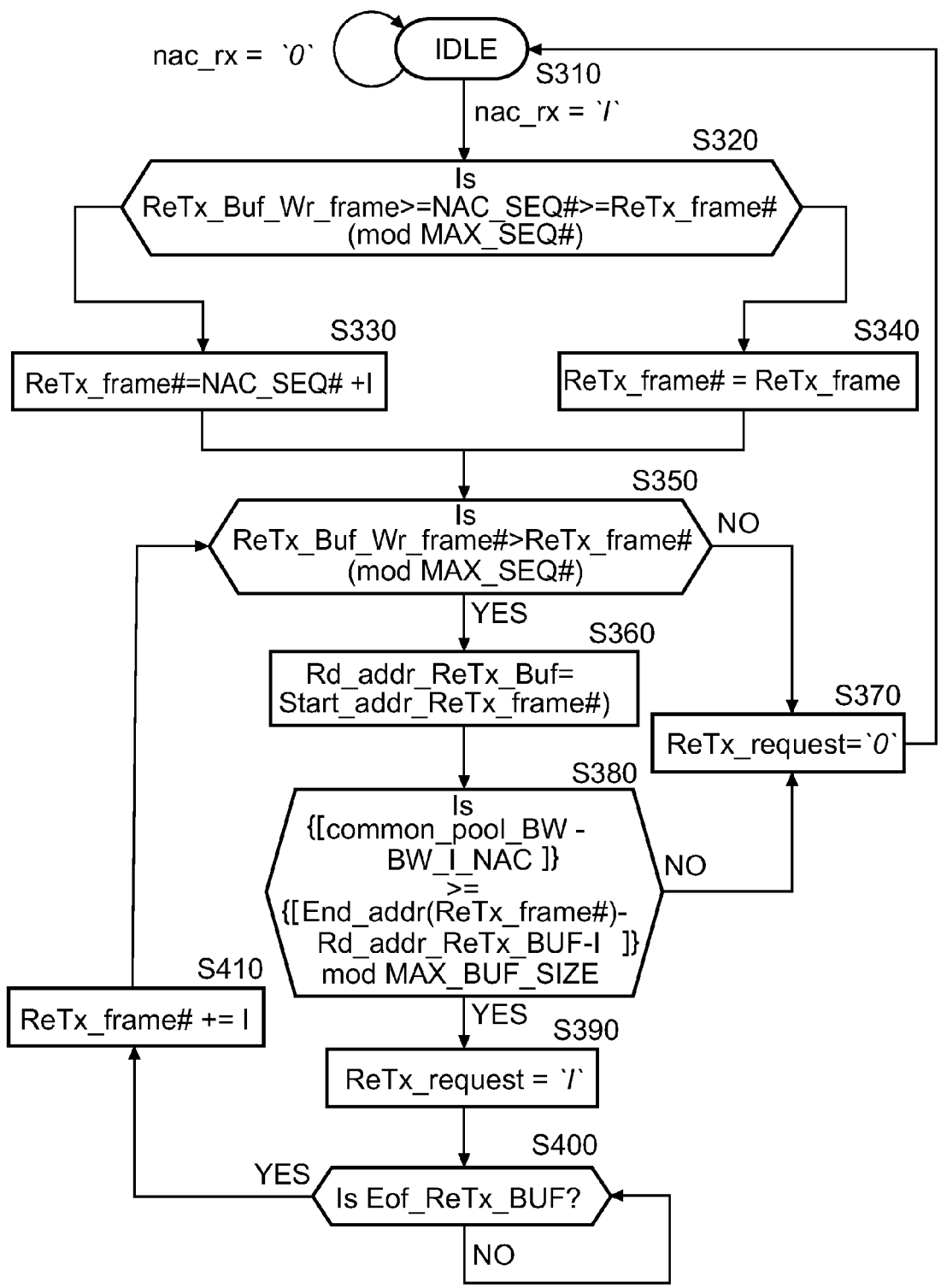
FIG. 7 shows a flow chart of a request generation for a retransmission according to the invention.

FIG. 7 shows a flow chart of a request generation in a re-transmission processing unit according to FIG. 1. In particular, the state machine of the request generation in the re-transmission processing unit is depicted. Pointers in the state machine point to the frame sequence numbers, with the writer frame pointer (ReTx_Buf_Wr_frame#) holding the value for the recently transmitted soft real-time SRT frame and the re-transmission frame pointer (ReTx_frame#) holding the sequence number of the frame that is needed to be re-transmitted next. Whenever a NAC frame is received, this state machine is triggered. First of all the sequence number carried in the NAC frame is checked (step S320) to know whether it is the latest. If this sequence number is not between the re-transmission pointer and the write pointer or equal to these pointers, it means that it contains obsolete sequence number and is ignored (S340). Else the re-transmission pointer is updated to point to next sequence number after the one acknowledged by the NAC (S330). Modulo operations are performed to account for the cases where the pointers wrap around, so that the comparisons yield correct results (in step S320). Once the re-transmission pointer is updated, we checked whether there is a case for re-transmission by comparing whether the write frame pointer is greater than the re-transmission frame pointer (S350). While doing the comparison care is taken to address the pointer wrap around. If there are no frames to be re-transmitted then the state machine de-asserts request (S370) and returns to the IDLE state (step S310). Else the read address pointer (Rd_addr_ReTx_Buf) of the retransmission buffer is updated as the acknowledged frames are skipped (S360). Then it checks if there is enough bandwidth available in the common pool to transmit the frame currently pointed to by the re-transmission frame pointer (step S380). Since a NAC frame can pre-empt this retransmission, it needs to be accounted for it while calculating the bandwidth. If bandwidth is available then the Re-transmission request to the RTTA is asserted (S390) and then wait until an end of frame (EoF) is received (S400) from the RPM grant processing state machine shown in the FIG. 8. Once an EoF is received we increment the re-transmission frame pointer (step S410) and repeat the test (S350) for determining if there are any more frames to be replayed. If there are frames, the above steps are repeated again. If any frame that is to be re-transmitted runs out of bandwidth, re-transmission is aborted and the state machine returns to the IDLE state (S310) after de-asserting the re-transmission request.

Figure 8:
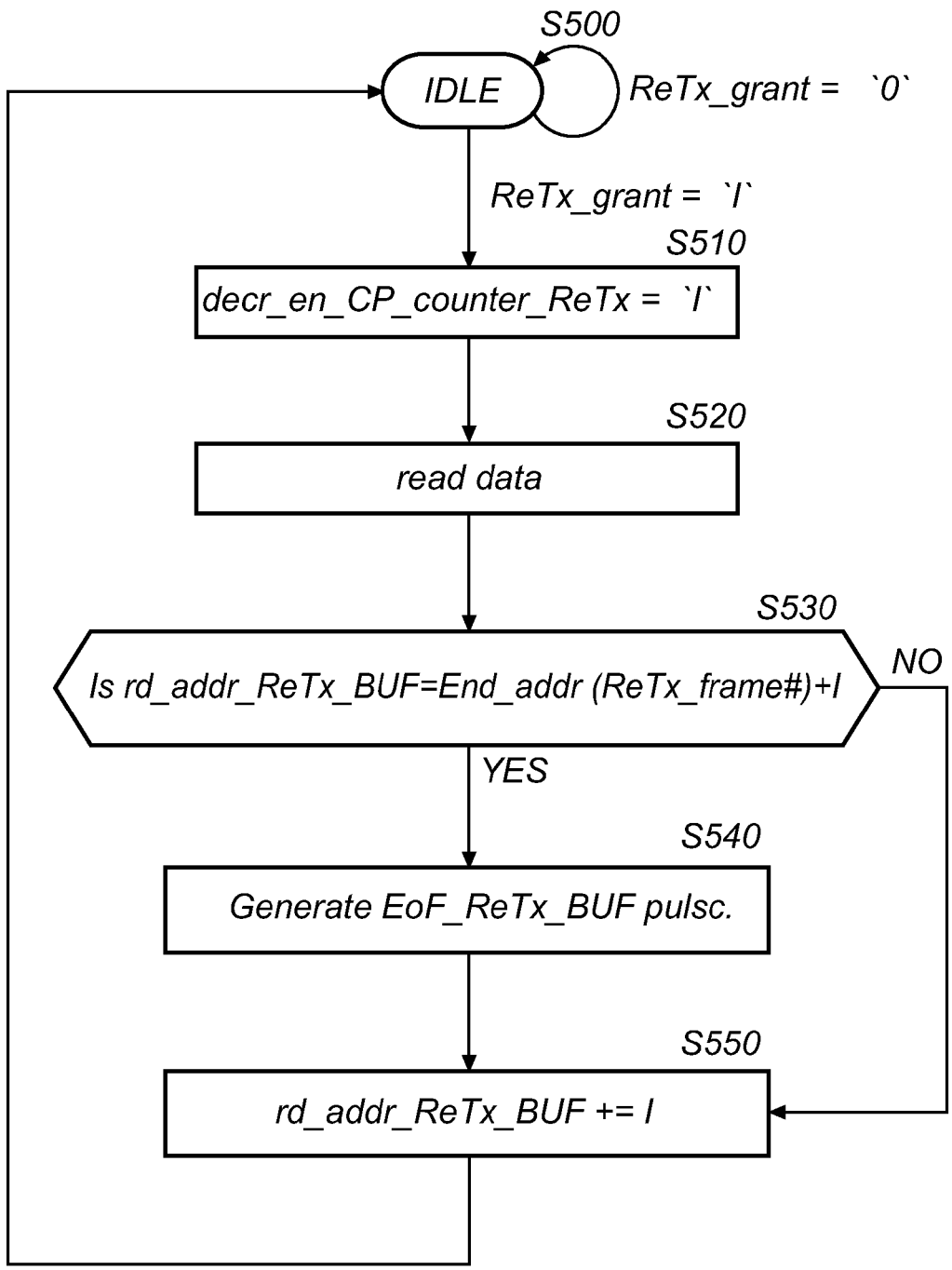
FIG. 8 shows a flow chart of a grant processing state machine for a retransmission processing according to the invention.

FIG. 8 shows a flow chart of a grant processing in a re-transmission processing unit according to FIG. 1. Whenever a grant is received from the arbiter RTTA, the state machine is triggered (step S500). Since there is adequate bandwidth for this frame to be re-transmitted, a decrement enable is given to the common pool counter (step S510). Simultaneously data is read out of the buffer (step S520). Then a check is made (step S530) to determine whether the byte that was read out was the last byte of a frame. If it was then the state machine generates an end of frame indication to the RPM request processing state machine and the arbiter RTTA (step S540). It then returns to the IDLE state after incrementing the read address pointer to the re-transmission buffer (step S550). If the test for the last byte of the frame failed, the state machine skips the EoF pulse generation. Only the read address pointer is incremented to point to next location and state machine returns to the IDLE state.

Figure 9:
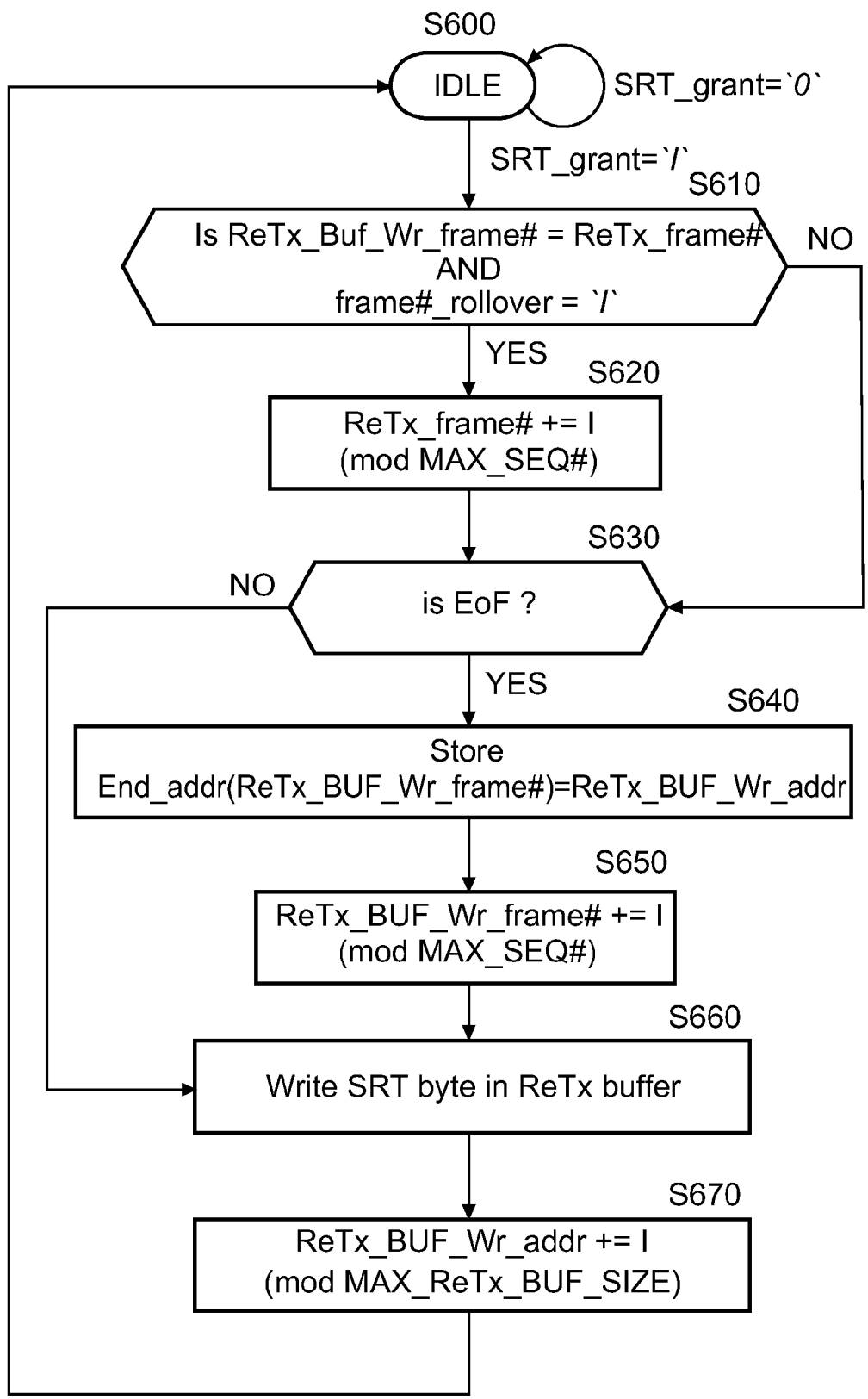
FIG. 9 shows a flow chart of an overwrite handling of a retransmission buffer according to the invention.

FIG. 9 shows a flow chart of a re-transmission buffer overwrite handling method in a re-transmission processing unit according to FIG. 1. The functionality provided by this state machine is required because there could be instances where no NAC frame are obtained for long enough duration that the re-transmission buffer fills up. In this case the scheme assumes that there have been no errors and proceeds to overwrite the data in the buffer. The transmission of a soft real-time traffic SRT frame and re-transmitted frame is mutually exclusive. This state machine does not function when a re-transmission is being done.

The state machine comes out of the IDLE state (step S600) whenever there is a SRT grant from the arbiter RTTA. When a grant is received by any SRT connection it starts reading data out of its CPB buffer. This packet from the buffer, after L2 processing by L2FPM is transmitted on the link and also is stored in ReTx buffer. First a test is made to see whether the write frame pointer of the re-transmission buffer (ReTx_BUF_Wr_frame#) is pointing to the frame that is to be re-transmitted next and the frame# roll over flag is set (step S610). The frame# roll over flag is set when write frame pointer wraps around and is reset when the retransmission frame pointer wraps around. If it is true, then the re-transmission frame number pointer (ReTx_frame#) is incremented (S620) so that a partial frame is not re-transmitted.

If the test fails, we need to check whether it is the last byte of the frame that is being transmitted from the CPB buffer (S630). In that case the end address of the currently stored frame is stored in the frame number-address memory (step S640). Then the write frame number pointer (ReTx_BUF_Wr_frame#) is incremented (S650) and then proceed to write the byte in the re-transmission buffer (step S660). Finally the re-transmission buffer write address pointer is incremented (step S670) and state machine returns to IDLE state. If the current byte is not end of the frame, then there is no need to update the write frame number pointer and also the step to store the end address of frame is skipped.

The real-time traffic arbiter RTTA is the main block of the whole scheme and comprises of a state machine RTTASM that performs the arbitration between the requests from the different traffic categories, a unit SRCR, HRCR that performs the request contention resolution and grant distribution of the connections within a category and the common pool counter. This unit also controls the periodic bandwidth update.

The arbiter RTTA state machine arbitrates among the requests from various traffic categories that want to transmit data and it generates grants to the traffic categories based on their priorities. Whenever a grant is issued to connection, it also makes a request to the L2 static priority arbiter for transmission of real-time traffic, it pre-empts requests from lower priority traffic categories to serve the higher priority requests and it serves the pre-empted connection before any other request from same priority level is handled.

Figure 10:
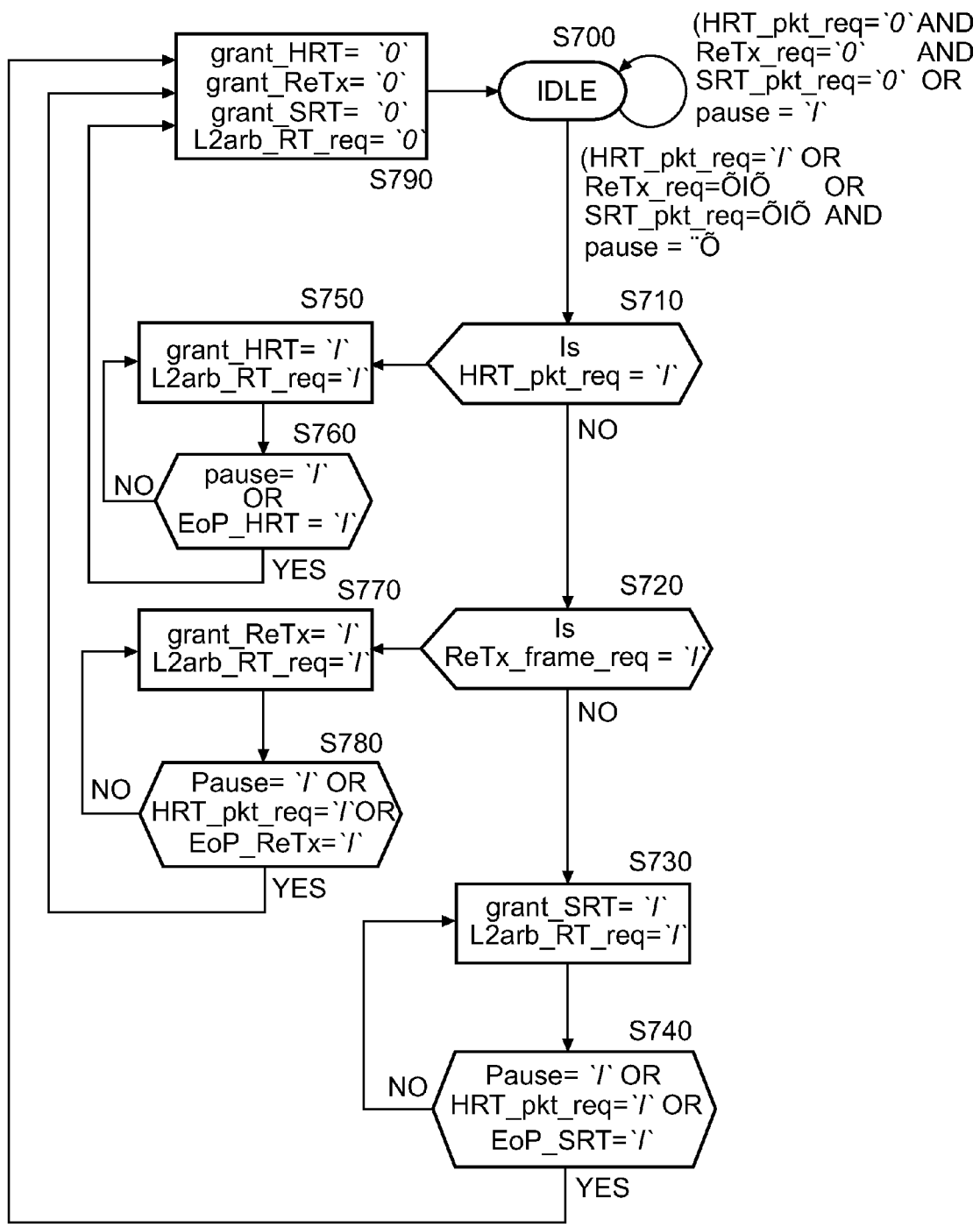
FIG. 10 shows a flow chart of an arbiting state machine according to the invention.

FIG. 10 shows a flow chart of a state machine of the real-time traffic arbiter of FIG. 1. The request signal from a particular category is asserted when any one of the connections belonging to that category is asserted. For example, the HRT_req is set to active when at least one of the hard real-time traffic connections has a request and it is de-activated if an end of packet is received and there are no further requests from the hard real-time category. This is the case with other two categories. The arbiter stays in the IDLE state (step S700) as long as pause signal is asserted or there is no request from any of the traffic categories. Once it gets a request on any traffic category and there is no pause signal, arbiter comes out of the IDLE state. First it checks for hard real-time request (step S710) as it has the highest priority after pause. If it is found to be the reason for coming out of IDLE state, then the arbiter asserts the grant for HRT (step S750). Arbiter RTTA continues in this state until a pause signal arrives or end of packet is reached (step S760). If a pause is received while a grant is active, the arbiter de-asserts the grant and goes to IDLE state (step S760). After the pause is de-asserted, since HRT_req is still asserted, arbiter returns to the HRT grant issue state where in it asserts the grant to the HRT traffic. If end of packet is reached, arbiter returns to the IDLE state to wait for any new requests. If a request arrives from lower traffic category while a higher one is being granted, then this request is stored and taken up after the higher priority requests are served.

If the reason for coming out of IDLE state is not a HRT request (step S710), then the arbiter checks whether it is a re-transmission request (step S720). If this is found to be true, then a grant is given to the re-transmission traffic category (step S770). Similar to the HRT grant state, the arbiter exists this state if a pause or end of frame occurs (step S780). Additional condition here is a HRT request, which has a priority over the re-transmission traffic.

If reason for coming out of IDLE state is neither HRT or re-transmission traffic, then it is a soft real-time traffic SRT request and hence a grant is given to this category (step S730). Case for the arbiter to exit this state is similar to the one for the re-transmission grant state. Though re-transmission has higher priority than SRT traffic request, a SRT request cannot be pre-empted by a re-transmission request and it has to wait until the current SRT request is over. Finally, whenever a grant is issued to a connection, a real-time traffic frame transmission request is given to the L2 static priority arbiter.

In the current arbitration scheme HRT traffic is allowed to be pre-empted by the control frames (using pause signal from L2 static arbiter block). However, if the jitter requirements are very tight we can do away with this pre-emption by removing the pause signal from the condition to exit HRT grant state. This also can require for modifications in the L2 static priority arbiter.

Figure 11:
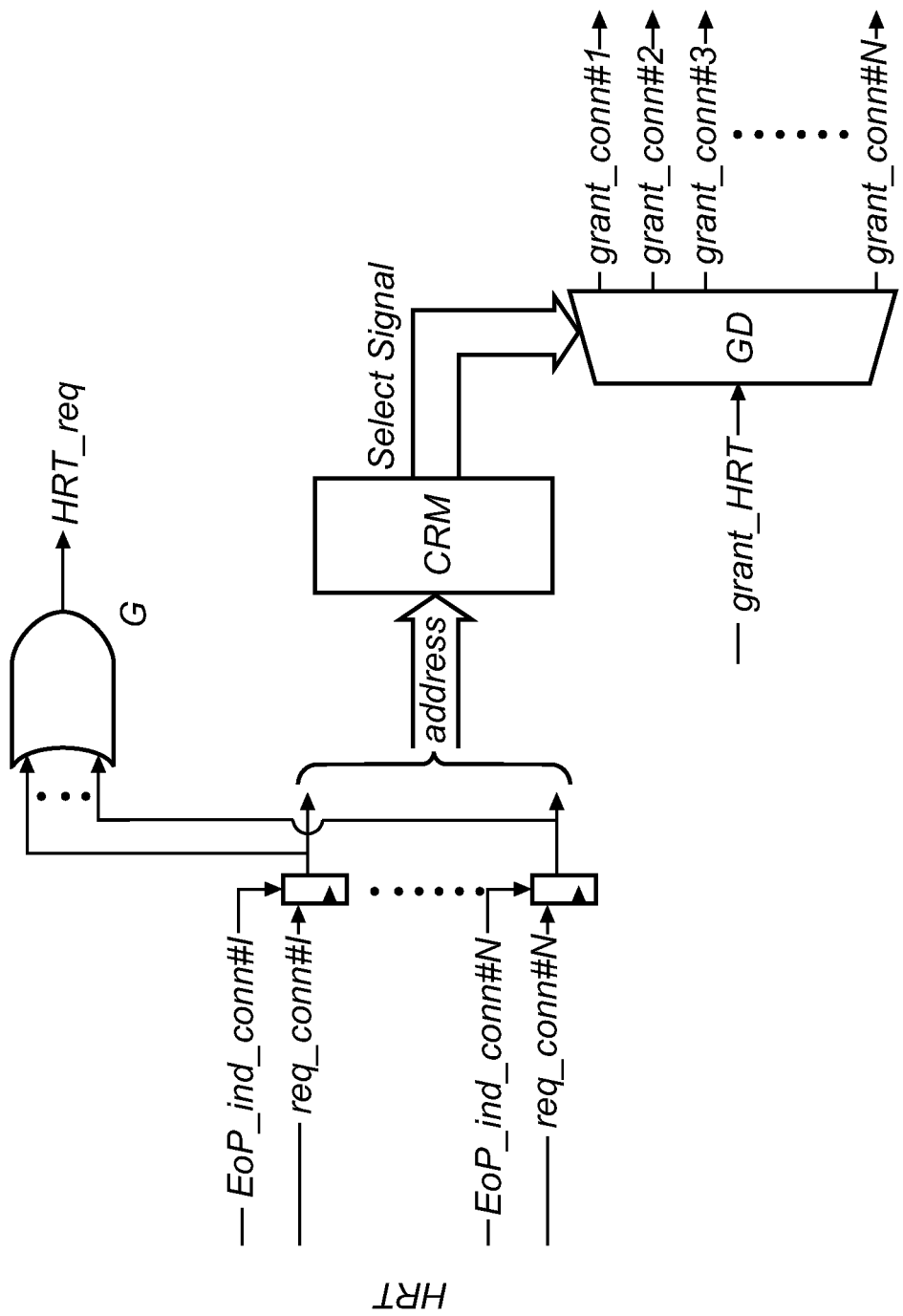
FIG. 11 shows a flow chart of a request contention resolution and grant distribution state machine according to the invention.

FIG. 11 shows a request contention resolution and grant distribution unit of FIG. 1. This unit is in particular used for hard real-time traffic. Several connections may belong to the hard real-time traffic category like req_conn#1, namely a request signal from a connection#1 end of packet indication EoP_ind_conn#N from a connection#n, a grant signal asserted by the arbiter state machine grant_HRT and a grant signal asserted by the arbiter state machine given as a grant to connection#n grant_conn#n, which may be chosen by the arbiter. These signals can be combined in a gate G which outputs a request HRT_req for hard real-time traffic. The requests are also inputted to a contention resolution memory CRM which are outputs a select signal to a grant distribution unit GD which also receives a grant signal grant_HRT and which outputs a grant to each of the connections.

The requests from the individual HRT connections are latched in a "request pending" latch whenever it arrives. The request for a connection is cleared when an end of packet indication is received from that particular connection. If there are further requests waiting in the pipeline from that connection then this "request pending" latch is not reset. The output of these latches is fed as address lines to an arbitration memory CRM. At the memory location pointed to by this address, the connection number that wins the link bandwidth is stored. This connection number is used to de-multiplex the grant given to the HRT category by the arbiter RTTA state machine. This method of storing the winner of a contention between different connections in a memory with each connection's request signal as address to the memory location has the advantage that connections are not associated with fixed priorities. For example, a newer connection (conn_3) can be commissioned with a higher priority than the existing connections (conn_1 & conn_2) and its connection number can be stored at the new possible memory location (address=0b1XX). Without this connection being active this particular memory location will not be valid (the request signal='0' implies valid addresses are 0b0XX). This feature is novel with respect to the prior art as the connections and their priorities are not statically mapped. By configuring the memory when a new connection is commissioned (or de-commissioned) a higher or lower priority than existing connections can be associated to the new connection. This method provides flexibility to allocate different priorities (higher, lower, or even in between priority) to new connections that are set up. A similar sub-module exists for soft real-time traffic category.

The arbiter RTTA also contains the common pool counter CPC. This counter gets updated periodically and is decremented whenever control, re-transmission or VBR-rt traffic above the minimum bandwidth is transmitted. The decrement enable of the common pool counter is a logical OR of independent decrement enables from these connections. Decrement enables from the connections is latched to address the case where in there are simultaneous enables from control traffic and any other connection.

Figure 12:
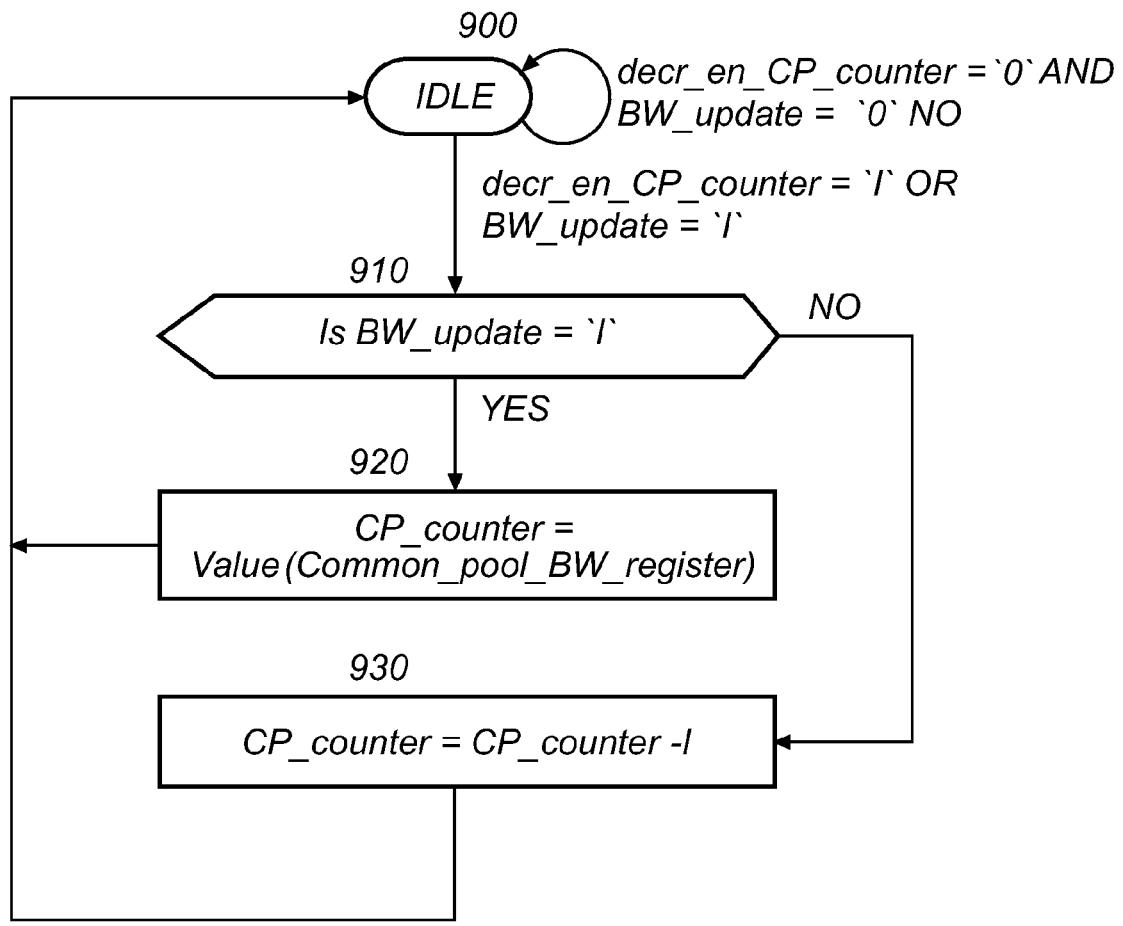
FIG. 12 shows a flow chart of a common counter control state machine.

FIG. 12 shows a flow chart of a common pool counting method according to the invention. The state machine is triggered (step S900) when either a decrement enable dec_en_CP_counter or a Bandwidth update signal BW_update is received. Bandwidth update signal is same as the one given to the bandwidth counters in the CPB and is the periodic indication to load the counters with fresh bandwidth. Initial check is to determine if a bandwidth update signal caused the state machine to come out of the IDLE state. If this is found to be true, then common pool counter is loaded with the value in the common pool bandwidth register and the state machine returns to IDLE state (step S920). Even if there was a simultaneous decrement enable, it was belonging to the previous period common pool bandwidth. This is because whenever a request is made by any traffic category, it checks if it has enough bandwidth to transmit the whole frame. If it was not a bandwidth update signal that caused the state machine to come out of IDLE, it can be only a decrement enable. The common pool counter is decrement by one (step S930), to account for a byte and the state machine returns to the IDLE state.

The common pool counter state machine does not look for remaining bandwidth, as a connection looks at the bandwidth available from the common pool before making a request to the arbiter RTTA.

The L2 static priority arbiter L2 SPA implements a static priority with the control frames having the highest priority followed by real-time, followed by traffic class 1 and 0 of Unipro. This arbiter communicates with the arbiter RTTA when it is transmitting higher priority traffic by asserting a "pause" signal. This signal is also asserted when it senses a PHY re-initialization. The "pause" signal is de-asserted when both of the previous conditions are absent. Each traffic class module and also the control frame generation module have to issue requests to this block and based on the priority of the requests received, this block issues "grants". Since real-time traffic has highest priority among all the data traffic, it doesn't look for any grant from the L2 arbiter. The assumption is that if there is control traffic, then it will get a pause else it is going to win the link bandwidth. This block also has a small buffer to hold the data that is already transmitted by the CPM or RPM before they react to the pause signal. This block also adds the necessary symbols to indicate continuation of a frame after a pre-emption from a control frame according to UniPro specifications.

The L2 Frame Processing Module (L2FPM) performs the functionality of adding Data Link layer headers and trailers according to frame format mentioned in the UniPro specification. All the soft real-time connection traffic gets a frame sequence number assigned when they are transmitted.

In the above described embodiments, the principles of the invention can be implemented based on a UniPro protocol. However, it should be noted that the principles of the invention can also be implemented based on other protocols.

The invention relates to a method for ensuring guaranteed services for real-time traffic on an interconnect with errors, wherein the real-time traffic comprises a first and a second traffic class (HRT, SRT), comprising the steps of: transmitting real-time traffic of the first and/or second traffic class (HRT; SRT) from a transmitter to a receiver; detecting by the receiver whether an error has occurred during the transmission of the real-time traffic and reporting the error to the transmitter; and re-transmitting at least part of the real-time traffic of the second traffic class (SRT) by the transmitter if the transmitter has received an error report from the receiver within a predetermined time period. The second traffic class, namely soft real-time trafficSRT allows a bounded number of retransmissions, which can optionally be at most a single retransmission. The real-time traffic can be combined with best-effort traffic (AFC, Tc-1, Tc-0).

The communication over the interconnect is based on connections each with at least a guaranteed communication bandwidth. Alternatively, the communication over the interconnect is based on connections each with at least a guaranteed communication bandwidth and comprises a variable bit rate, the method comprising the steps of: associating at least one first bandwidths to each first connection; providing a common pool bandwidth unit for associating additional at least one second bandwidth to the at least one first bandwidth if required, and/or for providing at least one third bandwidth for re-transmissions of at least part of the at least one first connection if the first connection comprises traffic of the second traffic class (SRT) and for providing bandwidth for third traffic (NAC, Tc-1, Tc-0). The traffic may comprise hard real-time traffic as first traffic class (HRT), soft real-time traffic as second traffic class (SRT), control traffic (NAC) and/or best-effort traffic. The best-effort traffic, the control traffic, the first traffic class (HRT), re-transmissions of second class traffic, and second class traffic (SRT) have priorities associated to them in decreasing order, respectively. The best-effort traffic has the lowest priority. A higher-priority traffic may preempt lower-priority traffic. The number of preemptions can be bounded, e.g. number of preemptions is at most one. The number of preemptions is bounded per traffic class, e.g. the number of preemptions is bounded per traffic class is at most one The invention also relates to an electronic device, comprising: an interconnect with errors used for real-time traffic communication, wherein the real-time traffic comprises a first and a second traffic class (HRT, SRT); re-transmission processing unit (RPM) for initiating a re-transmission of at least part of the real-time traffic of the second traffic class (SRT) if an error report has been received, and a real-time traffic arbiter (RTTA) for performing an arbitration of the re-transmission of at least part of the real-time traffic of the second class (SRT). The arbiter can also arbitrate between the first and second traffic class HRT and SRT. The soft real-time traffic SRT allows a bounded number of retransmissions, e.g. at most a single retransmission.

The invention also relates to an electronic device, comprising: an interconnect for real-time traffic communication based on connections, wherein the real-time traffic comprises a first and a second traffic class (HRT, SRT); connection processing module unit (CPM) for processing the connections; re-transmission processing unit (RPM) for initiating a re-transmission of at least part of the real-time traffic of the second traffic class (SRT) if an error has occurred during the transmission; and a real-time traffic arbiter (RTTA) for performing an arbitration of the re-transmission of at least part of the real-time traffic of the second class (SRT). The arbiter can also arbitrate between the first and second traffic class HRT and SRT. The soft real-time traffic SRT allows a bounded number of retransmissions, e.g. at most a single retransmission. For each of the first (HRT) and the second (SRT) traffic classes, the real-time traffic arbiter (RTTA) comprises a contention resolution and grant distribution unit (HRCR and SRCR, respectively), which is used to resolve the contention among the requests from connections belonging to the first and second traffic classes, respectively, and to distribute the grant to the winner of the contention. It arbitrates within a traffic class using a table whose indexes are created by concatenating the requests from all connections belonging to a traffic class. It can select the winner of the contending requests by using the pre-programmed value at the indexed location in the table. This value is programmed when the connection is set up. It can further suppress further requests, from the winning connection, in the index creation for a time period until all the contending lower priority connections that were pending are served.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. In the device claim enumerating several means, several of these means can be embodied by one and the same item of hardware. The mere fact that certain measures are recited in mutually different dependent claims does not indicate that a combination of these measures cannot be used to advantage.

Furthermore, any reference signs in the claims shall not be constrained as limiting the scope of the claims.

The invention claimed is:

1. Method for ensuring guaranteed services for real-time traffic on an interconnect with errors, wherein different categories of traffic including control traffic, a first traffic class, re-transmissions of a second traffic class, the second traffic class, and best-effort traffic have priorities associated to them in decreasing order respectively, and wherein the real-time traffic comprises one or more of hard real-time traffic as the first traffic class, soft real-time traffic as the second traffic class, the control traffic, and the best-effort traffic, comprising the steps of:
  transmitting the real-time traffic from a transmitter to a receiver;
  detecting, by the receiver, whether an error has occurred during the transmission of the real-time traffic and reporting the error to the transmitter; and
  if the real-time traffic comprises the first traffic class, passing on the real-time traffic of the first traffic class regardless of errors without waiting for a re-transmission;

if the real-time traffic comprises the second traffic class, re-transmitting at least part of the real-time traffic of the second traffic class by the transmitter if the transmitter has received an error report from the receiver within a predetermined time period.

2. Method according to claim 1, wherein the transmission over the interconnect is based on connections, each of which has at least a guaranteed communication bandwidth.

3. Method according to claim 1, wherein the transmission over the interconnect is based on connections, each of which has at least a guaranteed communication bandwidth and comprises a variable bit rate, the method comprising the steps of:
 associating at least one first bandwidth with each of the connections;
 providing a common pool bandwidth unit to be used for one or more of associating an additional at least one second bandwidth with the at least one first bandwidth if required, and for providing at least one third bandwidth for re-transmissions of at least part of at least one of the connections if the at least one of the connections comprises traffic of the second traffic class and for providing bandwidth for third traffic.

4. Electronic device, comprising:
 an interconnect for real-time traffic communication, wherein errors may occur at the interconnect, wherein different categories of traffic including control traffic, a first traffic class, re-transmissions of a second traffic class, the second traffic class, and best-effort traffic have priorities associated to them in decreasing order respectively, and wherein the real-time traffic comprises one or more of hard real-time traffic as the first traffic class, soft real-time traffic as the second traffic class, the control traffic, and the best-effort traffic, and wherein the errors occurred at the interconnect during transmission of the real-time traffic are reported, and wherein if the real-time traffic comprises the first traffic class, the real-time traffic is passed on from the interconnect regardless of errors at the interconnect, without waiting for a re-transmission over the interconnect;
 re-transmission processing unit for initiating a re-transmission of at least part of the real-time traffic if an error report has been received if the real-time traffic comprises the second traffic class, and
 a real-time traffic arbiter for performing an arbitration of the re-transmission of at least part of the real-time traffic of the second class.

5. Electronic device according to claim 4, wherein the real-time traffic arbiter comprises a common pool bandwidth counter for associating additional second bandwidth to the first bandwidth if required, for providing third bandwidth for re-transmissions of at least part of the traffic if the at least part of the traffic comprises traffic of the second traffic class and for providing bandwidth for third traffic.

6. Method for ensuring guaranteed services for real-time traffic on an interconnect with errors, wherein different categories of traffic including control traffic, a first traffic class, re-transmissions of a second traffic class, the second traffic class, and best-effort traffic have priorities associated to them in decreasing order, respectively, and wherein communication over the interconnect is based on connections each with at least a guaranteed communication bandwidth, comprising the steps of:
 associating a first bandwidth to each connection; and
 providing a common pool bandwidth unit to be used for one or more of associating additional second bandwidth to the first bandwidth if required, for providing third bandwidth for re-transmissions of at least part of one or more of the connections, and for providing bandwidth for third traffic;
 wherein the real-time traffic comprises one or more of hard real-time traffic as the first traffic class, soft real-time traffic as the second traffic class, the control traffic, and the best-effort traffic.

7. Method according to claim 6, wherein the communication over the interconnect comprises a variable bit rate, wherein the real-time traffic comprises a first and a second traffic class,
 wherein the common pool bandwidth unit is adapted for providing third bandwidth for re-transmissions of at least part of the one or more of the connections if the one or more of the connections comprises traffic of the second traffic class.

8. Method of claim 6, wherein the real-time traffic comprises a first and a second traffic class, and the traffic of the second traffic class is re-transmitted only if there is bandwidth available in the common pool bandwidth unit.

9. Electronic device, comprising:
 an interconnect for real-time traffic communication based on connections, wherein different categories of traffic including control traffic, a first traffic class, re-transmissions of a second traffic class, the second traffic class, and best-effort traffic have priorities associated to them in decreasing order, respectively, and wherein the real-time traffic comprises one or more of hard real-time traffic as the first traffic class, soft real-time traffic as the second traffic class, the control traffic, and the best-effort traffic;
 connection processing module unit for processing the connections;
 re-transmission processing unit for initiating a re-transmission of at least part of the real-time traffic, when the real-time traffic comprises the second traffic class if an error has occurred during the transmission; and
 a real-time traffic arbiter for performing an arbitration of the re-transmission of at least part of the real-time traffic of the second class wherein the real-time traffic arbiter comprises a common pool bandwidth unit for associating an additional second bandwidth with the first bandwidth if required, for providing a third bandwidth for re-transmissions of at least part of one or more of the connections if the one or more of the connections comprises traffic of the second traffic class and for providing bandwidth for the third traffic.

10. Electronic device of claim 9, wherein the re-transmission processing unit initiates a request for re-transmission to the real-time traffic arbiter only if sufficient bandwidth is available in the common pool.

11. Electronic device according to claim 9, wherein for each of the first and the second traffic classes, the real-time traffic arbiter comprises a contention resolution and grant distribution unit, which is used to resolve contention among requests from connections belonging to the first and second traffic classes, respectively, and to distribute a grant to the winner of the contention.

* * * * *